United States Patent
Delaney et al.

(10) Patent No.: US 12,047,187 B2
(45) Date of Patent: Jul. 23, 2024

(54) EVENT OVERLAP CONFLICT REMEDIATION

(71) Applicant: Lenovo (Singapore) Pte. Ltd., Singapore (SG)

(72) Inventors: Mark Delaney, Raleigh, NC (US); Arnold Weksler, Raleigh, NC (US); Nathan Peterson, Oxford, NC (US); Russell Speight VanBlon, Raleigh, NC (US); John C Mese, Cary, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 92 days.

(21) Appl. No.: 17/515,144

(22) Filed: Oct. 29, 2021

(65) Prior Publication Data

US 2023/0133769 A1    May 4, 2023

(51) Int. Cl.
| | |
|---|---|
| *H04L 12/18* | (2006.01) |
| *G06F 3/0482* | (2013.01) |
| *G06Q 10/04* | (2023.01) |
| *G06Q 10/109* | (2023.01) |
| *G06Q 10/1093* | (2023.01) |

(52) U.S. Cl.
CPC ........ *H04L 12/1822* (2013.01); *G06F 3/0482* (2013.01); *G06Q 10/04* (2013.01); *G06Q 10/1095* (2013.01)

(58) Field of Classification Search
CPC ... H04L 12/1822; G06F 3/0482; G06Q 10/04; G06Q 10/1095
See application file for complete search history.

(56) References Cited

U.S. PATENT DOCUMENTS

| | | | |
|---|---|---|---|
| 7,987,233 B1* | 7/2011 | Osborne | H04L 65/1043 709/206 |
| 9,235,826 B1* | 1/2016 | Hamilton | G06Q 10/103 |
| 10,176,463 B2* | 1/2019 | Abebe | G06Q 10/1095 |
| 2010/0005142 A1* | 1/2010 | Xiao | H04L 67/54 709/204 |
| 2010/0076804 A1* | 3/2010 | Jones | G06Q 10/1093 705/7.18 |
| 2010/0098230 A1* | 4/2010 | Bhow | H04M 3/56 379/202.01 |
| 2010/0189238 A1* | 7/2010 | Gupta | H04L 12/1818 379/202.01 |
| 2011/0054976 A1* | 3/2011 | Adler | G06Q 10/109 705/7.18 |
| 2012/0230484 A1* | 9/2012 | Kannappan | H04M 3/565 379/202.01 |

(Continued)

*Primary Examiner* — John B Walsh
*Assistant Examiner* — Hassan A Khan
(74) *Attorney, Agent, or Firm* — Ference & Associates LLC (57) ABSTRACT

One embodiment provides a method, including: detecting, using a processor, context data associated with a current event a user is engaged in; utilizing, based on the detecting, the context data to predict an end time of the current event; determining, based on the utilizing, that the end time of the current event will overlap with a start time of an upcoming event the user is scheduled to attend; and performing, responsive to the determining, an action to remediate issues associated with the overlap between the current event and the upcoming event. Other aspects are described and claimed.

18 Claims, 3 Drawing Sheets

(56) References Cited

U.S. PATENT DOCUMENTS

| | | | | |
|---|---|---|---|---|
| 2014/0123030 A1* | 5/2014 | Kozloski | ................ | G06Q 10/10 |
| | | | | 715/753 |
| 2015/0110259 A1* | 4/2015 | Kaye | ...................... | H04W 4/12 |
| | | | | 379/202.01 |
| 2015/0154291 A1* | 6/2015 | Shepherd | .............. | H04L 67/535 |
| | | | | 707/748 |
| 2016/0019485 A1* | 1/2016 | Hosabettu | .......... | G06Q 10/1095 |
| | | | | 705/7.19 |
| 2016/0140508 A1* | 5/2016 | Ossia | ................ | G06Q 10/1095 |
| | | | | 705/7.19 |
| 2018/0232705 A1* | 8/2018 | Baker | .................. | G06Q 10/103 |
| 2018/0253215 A1* | 9/2018 | Powell | .................... | H04L 51/18 |
| 2021/0083889 A1* | 3/2021 | Chakra | ................ | H04L 67/535 |
| 2021/0409235 A1* | 12/2021 | Cui | ...................... | H04L 12/189 |
| 2023/0022533 A1* | 1/2023 | Lu | ...................... | H04L 65/4038 |

* cited by examiner

EVENT OVERLAP CONFLICT REMEDIATION

BACKGROUND

Advances in technology have enabled individuals to access and participate in various types of remote meetings/conferences using their information handling devices ("devices"), for example smart phones, tablets, laptops and/or personal computers, hybrid devices, and the like. More particularly, users may join (e.g., via a conferencing application, etc.) a remote meeting in which they may interact with other meeting participants and share various types of information (e.g., documents, slides, images or videos, etc.). It is not uncommon for users to have multiple remote meetings scheduled throughout the day.

BRIEF SUMMARY

In summary, one aspect provides a method, including: detecting, using a processor, context data associated with a current event a user is engaged in; utilizing, based on the detecting, the context data to predict an end time of the current event; determining, based on the utilizing, that the end time of the current event will overlap with a start time of an upcoming event the user is scheduled to attend; and performing, responsive to the determining, an action to remediate issues associated with the overlap between the current meeting and the upcoming event.

Another aspect provides an information handling device, including: a processor; a memory device that stores instructions executable by the processor to: detect context data associated with a current event a user is attending; utilize, based on the detecting, the context data to predict an end time of the current event; determine, based on the utilizing, that the end time of the current event will overlap with a start time of an upcoming event the user is scheduled to attend; and perform, responsive to the determining, an action to remediate issues associated with the overlap between the current event and the upcoming event.

A further aspect provides a product, including: a storage device that stores code, the code being executable by a processor and comprising: code that detects context data associated with a current event a user is attending; code that utilizes, based on the code that detects, the context data to predict an end time of the current event; code that determines, based on the utilizing, that the end time of the current event will overlap with a start time of an upcoming event the user is scheduled to attend; and code that performs, responsive to the code that determines, an action to remediate issues associated with the overlap between the current meeting and the upcoming event.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A common issue that many individuals encounter is an overlap conflict between a current event (e.g., a meeting or activity, etc.) and an upcoming scheduled event (e.g., another meeting, another activity, etc.). More particularly, as an example, meetings occasionally run longer than their originally scheduled end time. If the individual has another scheduled matter directly abutting the anticipated end time of their current meeting, they may encounter a variety of different issues. For instance, the individual may arrive late to the subsequent event or may be forced to skip it. In such a situation, the individual may potentially miss out on important information (e.g., that may be presented in a subsequent meeting, etc.) and/or may upset one or more individuals engaged in the subsequent event. Alternatively, the individual may be forced to leave their current meeting prematurely, which may result in similar issues as previously described.

A user can take one or more conventional actions to lessen the negative impact of the overlap. For instance, an individual may attempt to reschedule the upcoming event. This solution, however, may be burdensome for the scheduled attendees of the upcoming event to accommodate and/or may not be possible or reasonable to do (e.g., if the user only realizes that an overlap will occur late into their current meeting, if various aspects of the upcoming event are too complex to easily reschedule, etc.). Alternatively, the user may attempt to inform the scheduled attendees of the upcoming event that they may be late or absent (e.g., via an email or other type of message, etc.). However, there is no guarantee that all of the scheduled attendees will receive the message in time, especially if the message was sent soon before the upcoming event was scheduled to begin.

Accordingly, an embodiment provides a method that can predictively detect that an event will run over its scheduled end time and automatically perform one or more actions to remedy/lessen the impact of the conflict. In an embodiment, context data that identifies a projected runtime of an event that the user is engaged in may be detected. An embodiment may then determine, based on this context data, that the runtime of the current event will conflict with a start time of another event that the user is scheduled to attend. Responsive to making this determination, an embodiment may thereafter automatically perform one or more actions that may remediate a conflict between the runtime of the current event and the start time of the upcoming event. Such a method may minimize the harm that an overlap conflict may create.

The illustrated example embodiments will be best understood by reference to the figures. The following description is intended only by way of example, and simply illustrates certain example embodiments.

Figure 1:
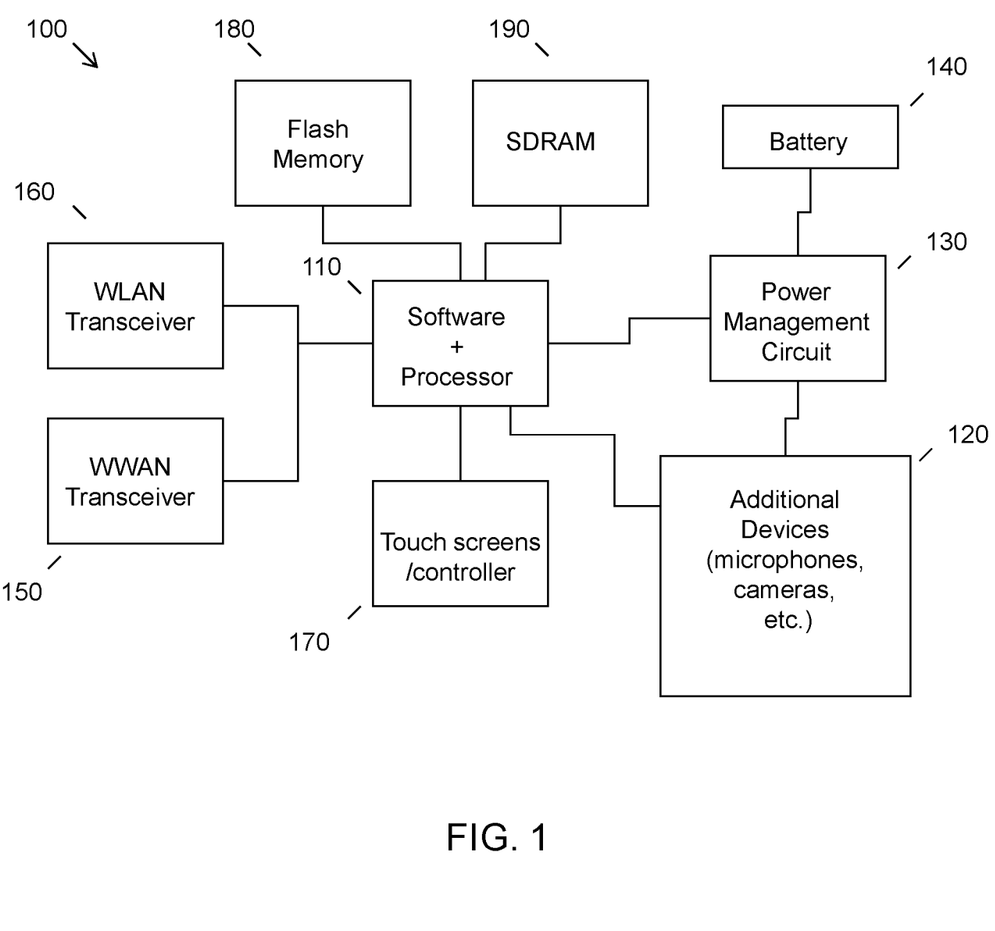
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
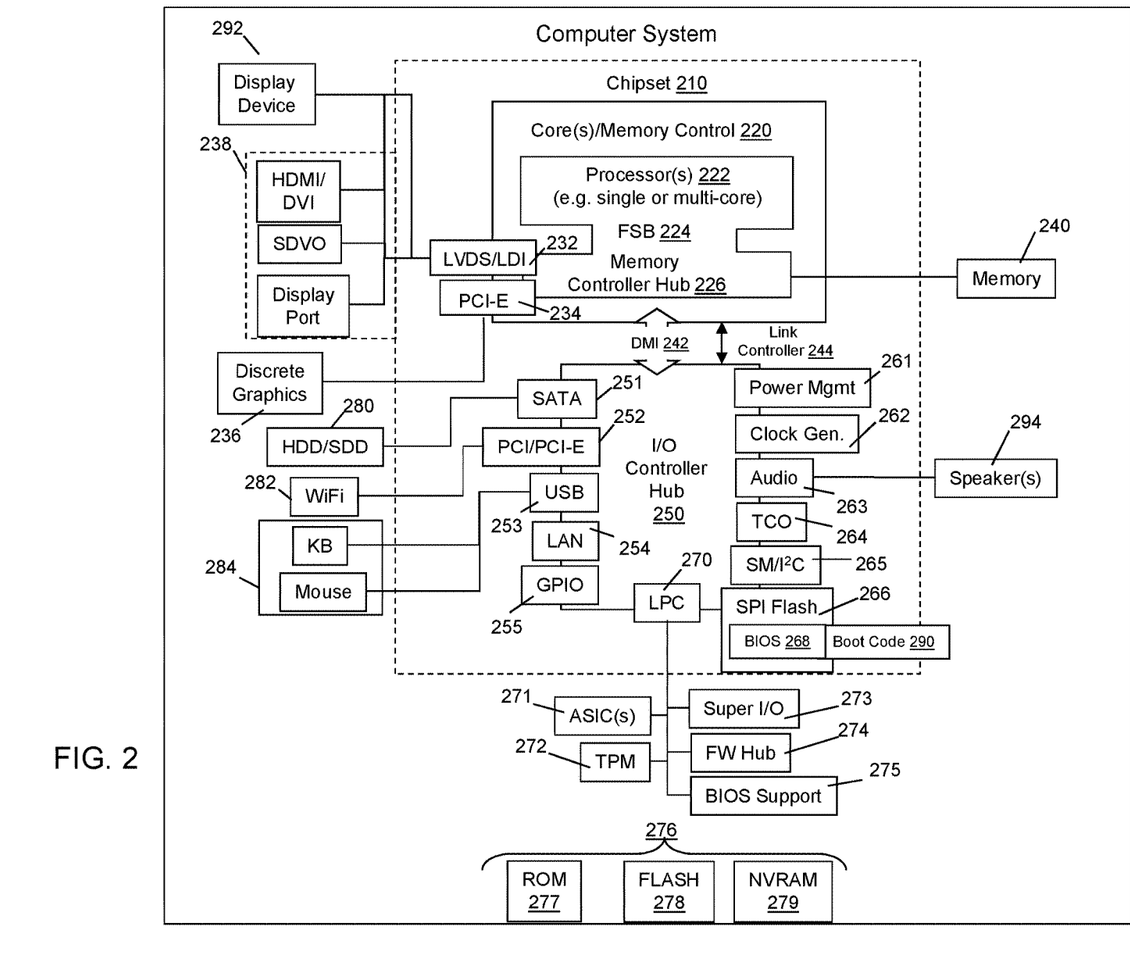
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in computing devices that enable users to connect to remote conferences. For example, the circuitry outlined in FIG. 1 may be implemented in a smart phone, whereas the circuitry outlined in FIG. 2 may be implemented into a laptop or personal computer.

Figure 3:
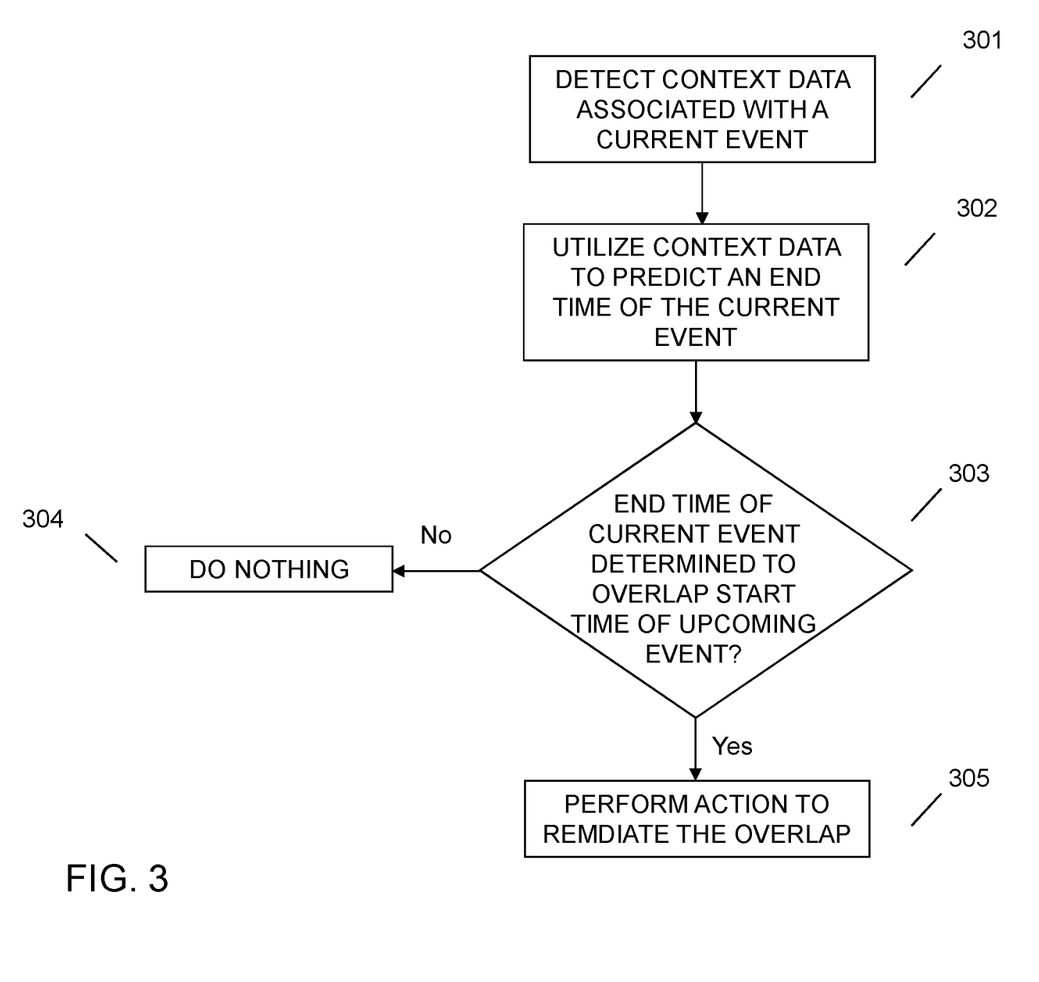
FIG. 3 illustrates an example method of performing an action to remediate a conflict between a current event and another scheduled event.

Referring now to FIG. 3, an embodiment provides a method for minimizing the negative affect associated with an event conflict. At 301, an embodiment may detect one or more different types of context data associated with a current event a user is engaged in. In the context of this application, the current event may be virtually any type of planned or unplanned event (e.g., a meeting a user is currently attending, an activity a user is currently performing, a situation a user may be experiencing such as traffic, etc.). For simplicity purposes, the remainder of this application is described with reference to the current event being a current meeting the user is attending. However, it is important to note that such a designation is not limiting and that other types of single or multi-person events may also be applicable.

In an embodiment, the current meeting the user is engaged in may be an online meeting/conference that a user is attending remotely (e.g., via an application or website on their device, etc.). In the context of this application, context data associated with the current meeting may refer to virtually any type of data that may provide an indication of the remaining run time of the meeting. Various types of relevant context data are further described below.

In an embodiment, the context data may correspond to conversation data occurring within the meeting. This conversation data may be words provided by or exchanged between (e.g., via speech input, typing input, stylus input, gesture input, etc.) the user and/or one or more participants in the current meeting. In an embodiment, the context data may correspond to content that is presented within the meeting. This content may refer to visual content (e.g., slides of a slide show, images, etc.), audible content (e.g., recorded media, etc.), or a combination thereof (e.g., a video, etc.). In an embodiment, if the current meeting involves a presentation, the context data may correspond to the number of remaining presenters. This number may be identified via accessing a list of scheduled presenters and determining which of the presenters in the list have yet to present. Additionally or alternatively, an embodiment may access historical presentation data associated with each of the scheduled presenters. This historical presentation data may identify average lengths of presentations previously delivered by each of the scheduled presenters. Additionally or alternatively, an embodiment may access speech delivery data associated with each of the scheduled presenters. This speech delivery data may identify various aspects of a presenter's speech pattern, such as their delivery speed.

With respect to other, non-meeting events, other types of context data may be referenced. For example, an embodiment may leverage a user's position data (e.g., obtained from Global Positioning System (GPS) data, Wi-Fi localization, etc.) to determine, for example, how far they have left to go in a scheduled run or walk. Additionally or alternatively, this type of position data may aid an embodiment in determining how long a user potentially may be stalled in traffic (e.g., by comparing the user's position to available traffic data, etc.). An embodiment may also access historical event length data. More particularly, an embodiment may identify an average amount of time that a user conventionally engages in an activity or an event and can utilize that knowledge to predict how long they will be engaged in a similar current event.

At 302, an embodiment may analyze and utilize the context data to dynamically predict an end time of the current meeting. For instance, with respect to conversation data, an embodiment may identify whether one or more specific words or phrases are present in the meeting conversation that may provide an indication of the remaining run time of the current meeting. This identification may be facilitated by accessing a database (e.g., stored locally on the device, stored remotely on another device or server, etc.) that contains stored phrases that an embodiment may be configured to monitor for in a conversation. As an example of the foregoing, an embodiment may predict that a meeting will end in approximately 15 minutes responsive to detecting certain phrases spoken by a meeting moderator, such as "we have about 15 more minutes left in the meeting" or "we should be done here at 4 PM" (given that the current time is 3:45 PM).

In another embodiment, the content presented within the meeting may be analyzed to predict the end time of the current meeting. This process may be facilitated by identifying various aspects of the content that may provide an indication of the remaining meeting run time. For example, an embodiment may predict that there are still thirty minutes left in the meeting responsive to identifying that a video playing in the meeting still has thirty minutes remaining. As another example, an embodiment may detect that slide ten of a twenty slide set is currently being displayed. An embodiment may identify that it took thirty minutes to cover the first ten slides and may conclude that it will take a similar amount of time to cover the last ten slides. Additionally, an embodiment may alter their prediction based upon the volume of content on each slide. For instance, if the first ten slides contained a large amount of content (e.g., lots of text, images, videos, etc.), but the back ten slides were much less dense, an embodiment may predict that the time to cover the back half of those slides will be less than the time it took to cover the first half.

In another embodiment, an identification of the amount and/or nature of the presentation style of remaining presenters in a meeting may be utilized to predict the end time of the current meeting. For instance, an embodiment may identify that two out of five scheduled individuals have finished presenting. Responsive to identifying that it took an average of ten minutes per individual to complete a presentation, an embodiment may predict that the last two individuals will require approximately twenty minutes to complete their presentations.

Additional metrics, if known, may further be relied on to bolster an embodiment's prediction of the meeting's end time. For instance, if an embodiment has access to a presenter's historical speech data (e.g., an average presentation length of previous presentations given by an individual, an average cadence or speed utilized by the presenter when speaking, etc.) an embodiment may utilize this data to better predict the meeting's end time. For example, if two presenters are left to speak, and an embodiment identifies that the first presenter historically averages approximately fifteen minutes to give a presentation and the second presenter historically averages approximately five minutes to give a presentation, then an embodiment may predict that the meeting will end in approximately twenty minutes.

At 303, an embodiment may determine whether the end time of the current meeting will overlap with a start time of an upcoming event the user is scheduled to attend. In an embodiment, the upcoming event may be another physical or remote meeting or another activity (e.g., a medical appointment, a social gathering, a travel commitment, etc.). In an embodiment, the determination may be facilitated by comparing the predicted end time of the current meeting to a scheduled start time of an upcoming event.

Responsive to determining, at 303, that the predicted end time of the current meeting will not cause an overlap with the upcoming event, an embodiment may, at 304, take no additional action. Conversely, responsive to determining, at 303, that the predicted end time of the current meeting will cause an overlap with the upcoming event, an embodiment may, at 305, perform an action to remediate issues associated with the overlap. In an embodiment, this action may be performed substantially immediately responsive to determining that an overlap will occur. Additionally, in an embodiment, this action may be performed automatically (i.e., without the receipt of any additional user input).

In an embodiment, the action may correspond to the provision of a selectable options list to the user. This options list may be presented to the user visually (e.g., in the form of a pop-up notification, etc.) and/or audibly (e.g., via an audible recitation of available actions a user can command an embodiment to take, etc.). In an embodiment, the options list may contain a variety of potential actions a system can perform to address the overlap. Available system actions may include: informing (e.g., via a message, etc.) the upcoming event participants that the user will be late, postponing the upcoming event start time (i.e., assuming the user has the authority to make such an adjustment), cancelling the upcoming event, and the like. Additionally or alternatively, the pop-up notification may contain an alert message that informs the user that their current meeting will overlap with a particular upcoming event.

Alternatively to the foregoing, an embodiment may perform certain functions automatically. For instance, an embodiment may automatically message the participants associated with the upcoming event that the user will be late or may automatically postpone or cancel the upcoming event. In an embodiment, the nature of the action performed by the system may be dictated by a severity of the projected overlap. For instance, if an embodiment determines that a user will only be slightly late to the upcoming event (e.g., by only a few minutes, etc.) then an embodiment may simply send a message to the participants associated with the upcoming event informing them of this fact. Additionally or alternatively, if an embodiment determines that a user will be moderately late to the upcoming event then an embodiment may dynamically postpone the upcoming event until after the projected current meeting end time. Additionally or alternatively, if an embodiment determines that a user will be severely late to the upcoming event (i.e., that the user will miss the majority of the upcoming event), then an embodiment may cancel and/or reschedule the upcoming event entirely.

Additionally or alternatively to the foregoing, in an embodiment, knowledge of certain aspects associated with the upcoming event may influence the nature of the performed actions. More particularly, an embodiment may first identify what will occur in the upcoming event during the time period of the user's projected absence (e.g., what content will be covered, what activities will be performed, etc.). Such information may be deduced from an event meeting invitation, received communications (e.g., emails, messages, etc.), other data sources having a general knowledge regarding the nature of the event (e.g., various internet sources, etc.), and the like. Thereafter, an embodiment may determine whether the user's absence during the occurrence of those portions will harm or inconvenience the user or another participant. This determination may be facilitated by identifying a user's profession or company position, a user's role in the upcoming event, etc. As a non-limiting example of the foregoing, the upcoming event may be another meeting and an embodiment may have access to a slide deck that will be presented in that meeting. An embodiment may then analyze the contents of the slide deck to determine that only the later slides in the presentation are relevant to the user's interests. In such a situation, an embodiment may either take no action at all or may take a small action that doesn't affect the originally scheduled start time of the event (e.g., an embodiment may notify the upcoming meeting participants that the user will be late, etc.). If, however, the opposite was true (i.e., that the initial slides were relevant to the user's interests), then an embodiment may dynamically request to postpone the meeting until the user is able to attend.

Additionally or alternatively to the foregoing, in an embodiment, the nature of the performed actions may also be influenced based upon a priority comparison between the current meeting and the upcoming event. More particularly, if the upcoming event was determined to take priority over the current meeting, then an embodiment may respond to the overlap in a different way than if the current meeting took priority over the upcoming event. For example, responsive to identifying that the upcoming event is a panel meeting with the user's supervisors and the current event is a social chat with the user's friends, an embodiment may perform one or more actions to ensure that the user attends the panel meeting on time (e.g., by informing the user about the priority difference of the two events, by messaging the user's friends that they need to leave soon, by automatically disconnecting the user from the current meeting and connecting the user to the future meeting, etc.). In an embodiment, factors that may be relied upon to during the priority comparison include: the relationship of the current meeting to the user's profession, the amount of time the user has actively contributed to the meeting, one or more explicit priority meeting designations, and the like.

The various embodiments described herein thus represent a technical improvement to conventional methods resolving conflict overlaps in meetings. Using the techniques described herein, an embodiment may first detect context data associated with a current meeting and then utilize that context data to predict an end time of the current meeting. An embodiment may then determine whether the end time of the current meeting will overlap with a start time of another scheduled event. Responsive to determining that an overlap will occur, an embodiment may perform one or more actions to remediate issues associated with the overlap. Such a method may therefore resolve meeting overlaps in a more dynamic and effective way than is currently being done via conventional techniques.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using a processor, context data associated with a current event a user is engaged in, wherein the context data comprises conversation data occurring within the current event;
    utilizing, based on the detecting, the context data to predict an end time of the current event, wherein the utilizing the context data to predict comprises identifying a historical speech delivery data comprising a plurality of aspects of a speech pattern of the at least one presenter and associated with at least one presenter within the current event;
    determining, based on the utilizing, that the end time of the current event will overlap with a start time of an upcoming event the user is scheduled to attend; and
    performing, responsive to the determining, an action to remediate issues associated with the overlap between the current event and the upcoming event, wherein the action performed is based upon a severity of the overlap and is based upon at least one aspect of the upcoming event, wherein the performing comprises determining a time period of the overlap within the upcoming event, identifying, based upon analyzing context data of the upcoming event to determined the context data in the time period of the overlap is relevant to the user, a relevance of the time period to the user, and performing no action responsive to identifying the time period is not relevant to the user.

2. The method of claim 1, wherein the context data corresponds to conversation data and wherein the determining comprises determining that the end of the current event will overlap with the start time of the upcoming event based on cues detected within the conversation data.

3. The method of claim 1, wherein the context data corresponds to visual content presented within the current event and wherein the determining comprises determining that the end time of the current event will overlap with the start time of the upcoming event based on an aspect of the visual content.

4. The method of claim 1, wherein the context data corresponds to an identification of a remaining number of presenters in the current event and wherein the determining comprises determining that the end time of the current event will overlap with the start time of the upcoming event based on an identification that the remaining number of presenters cannot present presentations before the start time of the upcoming event.

5. The method of claim 4, wherein the utilizing the context data to predict comprises identifying historical presentation lengths associated with each of the remaining number of presenters.

6. The method of claim 4, wherein the utilizing the context data to predict comprises identifying historical speech delivery rates associated with each of the remaining number of presenters.

7. The method of claim 1, wherein the performing the action comprises providing, to the user, a list of selectable options to remediate the conflict.

8. The method of claim 7, wherein options in the list comprise at least one of: a meeting postponement option, an attendee notification option, and an exit request option.

9. The method of claim 1, further comprising:
    identifying a first priority designation associated with the current event and a second priority designation associated with the upcoming event; and
    comparing the first priority designation to the second priority designation;
    wherein the action is based at least in part on a result of the comparing.

10. An information handling device, comprising:
    a processor;
    a memory device that stores instructions executable by the processor to:
    detect context data associated with a current event a user is engaged in, wherein the context data comprises conversation data occurring within the current event;
    utilize, based on the detecting, the context data to predict an end time of the current meeting, wherein to utilize the context data to predict comprises identifying a historical speech delivery data comprising a plurality of aspects of a speech pattern of the at least one presenter and associated with at least one presenter within the current event;

determine, based on the utilizing, that the end time of the current event will overlap with a start time of an upcoming event the user is scheduled to attend; and perform, responsive to the determining, an action to remediate issues associated with the overlap between the current event and the upcoming event, wherein the action performed is based upon a severity of the overlap and is based upon at least one aspect of the upcoming event, wherein the performing comprises determining a time period of the overlap within the upcoming event, identifying, based upon analyzing context data of the upcoming event to determined the context data in the time period of the overlap is relevant to the user, a relevance of the time period to the user, and performing no action responsive to identifying the time period is not relevant to the user.

11. The information handling device of claim 10, wherein the context data corresponds to conversation data and wherein the instructions executable by the processor to determine comprise instructions executable by the processor to determine that the end of the current event will overlap with the start time of the upcoming event based on cues detected within the conversation data.

12. The information handling device of claim 10, wherein the context data corresponds to visual content presented within the current event and wherein the instructions executable by the processor to determine comprise instructions executable by the processor to determine that the end time of the current event will overlap with the start time of the upcoming event based on an aspect of the visual content.

13. The information handling device of claim 10, wherein the context data corresponds to an identification of a remaining number of presenters in the current event and wherein the instructions executable by the processor to determine comprise instructions executable by the processor to determine that the end time of the current meeting will overlap with the start time of the upcoming event based on an identification that the remaining number of presenters cannot present presentations before the start time of the upcoming event.

14. The information handling device of claim 13, wherein the instructions executable by the processor to utilize the context data to predict comprise instructions executable by the processor to identify historical presentation lengths associated with each of the remaining number of presenters.

15. The information handling device of claim 13, wherein the instructions executable by the processor to utilize the context data to predict comprise instructions executable by the process to identify historical speech delivery rates associated with each of the remaining number of presenters.

16. The information handling device of claim 10, wherein the instructions executable by the processor to perform the action comprise instructions executable by the processor to provide, to the user, a list of selectable options to remediate the conflict.

17. The information handling device of claim 10, wherein the instructions are further executable by the processor to:

identify a first priority designation associated with the current event and a second priority designation associated with the upcoming event; and compare the first priority designation to the second priority designation;

wherein the action is based at least in part on a result of the comparing.

18. A product, comprising:

a storage device that stores code, the code being executable by a processor and comprising:

code that detects context data associated with a current event a user is attending, wherein the context data comprises conversation data occurring within the current event;

code that utilizes, based on the code that detects, the context data to predict an end time of the current event, wherein the code that utilizes the context data to predict comprises identifying a historical speech delivery data comprising a plurality of aspects of a speech pattern of the at least one presenter and associated with at least one presenter within the current event;

code that determines, based on the utilizing, that the end time of the current event will overlap with a start time of an upcoming event the user is scheduled to attend; and code that performs, responsive to the code that determines, an action to remediate issues associated with the overlap between the current event and the upcoming event, wherein the action performed is based upon a severity of the overlap and is based upon at least one aspect of the upcoming event, wherein the performing comprises determining a time period of the overlap within the upcoming event, identifying, based upon analyzing context data of the upcoming event to determined the context data in the time period of the overlap is relevant to the user, a relevance of the time period to the user, and performing no action responsive to identifying the time period is not relevant to the user.

* * * * *